UNITED STATES PATENT OFFICE.

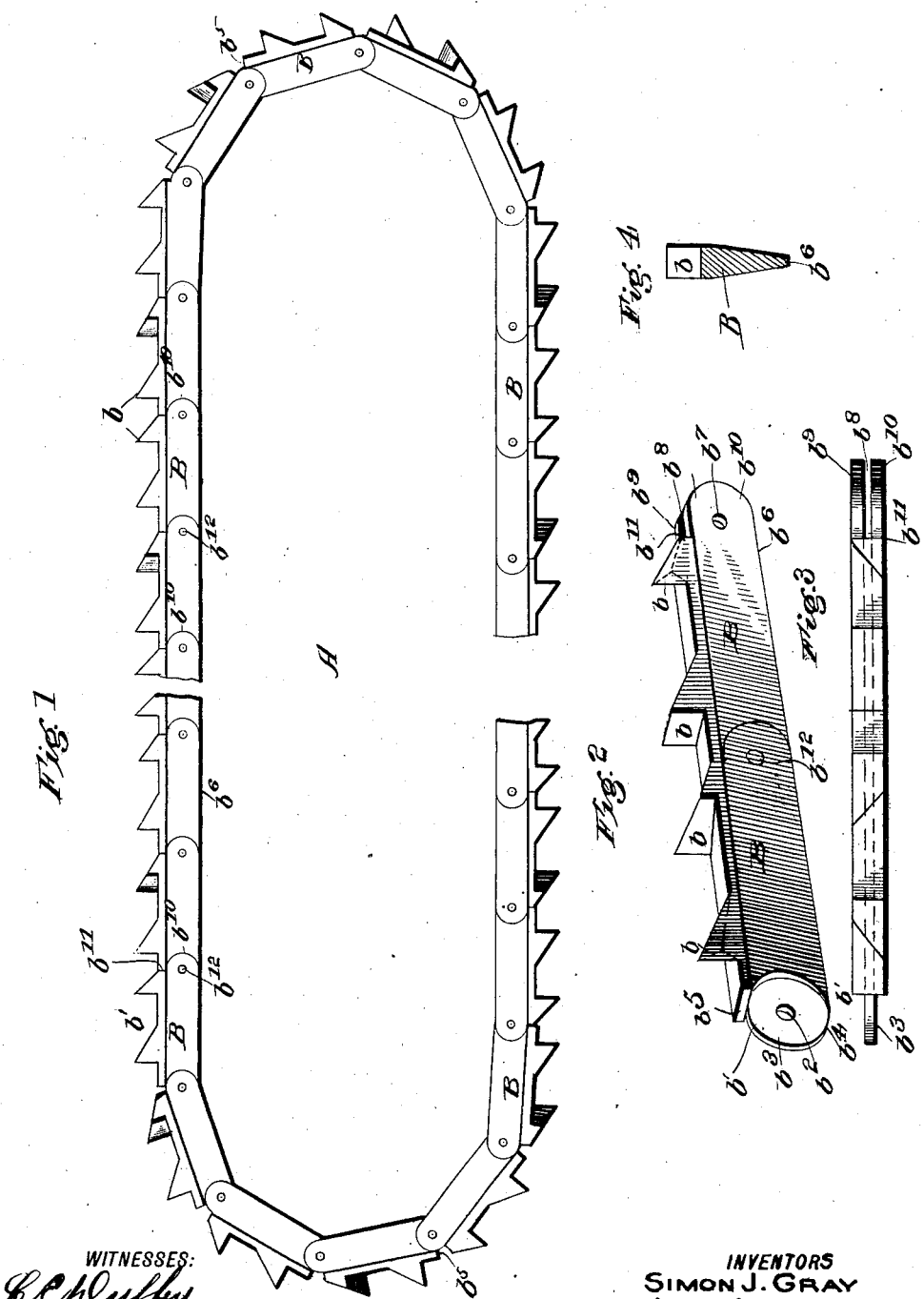

SIMON J. GRAY AND JOHN HORNING, OF OAKLAND, CALIFORNIA.

SAW.

No. 827,009.　　　　　　Specification of Letters Patent.　　　　　　Patented July 24, 1906.

Original application filed April 29, 1905, Serial No. 258,102. Divided and this application filed July 20, 1905. Serial No. 270,529.

*To all whom it may concern:*

Be it known that we, SIMON J. GRAY and JOHN HORNING, citizens of the United States, and residents of Oakland, in the county of Alameda and State of California, have made certain new and useful Improvements in Saws, of which the following is a specification.

Our invention is an improvement in saws; and it consists in certain novel constructions and combinations of parts hereinafter described and claimed.

Referring to the drawings forming a part hereof, Figure 1 is a plan view of the saw. Fig. 2 is a perspective view of two of the links. Fig. 3 is a top plan view of the same, and Fig. 4 is a transverse vertical section through one of the links.

In the practical application of our invention we provide an endless saw A, comprising a series of links B, connected at their ends to form an endless chain.

Each of the links B is substantially wedge-shaped in cross-section, as will be seen by referring to Fig. 4, and the wide edge or base is provided with a plurality of teeth $b$—two in the present instance—the teeth on each link being symmetrically arranged with respect to each other.

The ends of the links are provided with perforations $b^2$ $b^7$ at a point nearer to the lower than to the upper edge of the link, and the sides of the end $b'$ of the link are cut away over an area corresponding to that of a circle having for a center the perforation $b^2$ and a radius equal to the distance thereof from the lower or narrow edge of the link to form a knuckle $b^3$, the end of the link being rounded, as at $b^4$, on the circumference of the circle.

The upper edge of the link is cut away on a line coinciding with the vertical diameter of the circle to form an abutment $b^5$ for a purpose to be hereinafter described. The opposite end of the link $b^6$ has its end rounded on the circumference of the circle, having the perforation $b^7$ as a center and a radius equal to the distance of the perforation from the lower or narrow edge of the link.

A mortise $b^8$ is arranged vertically in the end $b^6$ to form ears $b^9$ $b^{10}$ for receiving the knuckle $b^3$ of the succeeding link, and the upper or wider edge of the link is cut squarely away on a line coinciding with the vertical diameter of the circle to form a surface $b^{11}$ for coacting with the face of the lug $b^5$ on the succeeding link of the chain, and a rivet $b^{12}$ is passed through the alined perforations $b^2$ $b^7$ to secure the links together, the outer faces of the ears being countersunk to receive the upset ends of the rivet flush with the surface of the link.

It will be evident from the description that the arrangement of the above-described joint while permtting a sufficient degree of flexibility in one direction will prevent any bending of the links with respect to each other in the opposite direction.

By making the link substantially wedge-shaped in cross-section and placing teeth on the base of the wedge a very strong link is secured with a smaller amount of metal than would be necessary with a link rectangular in cross-section. The wide edge of the link is especially adapted to withstand compression strain and to afford a broad attachment for the teeth, while the narrow edge is sufficiently strong to resist a tension strain. The gradual and even reduction of thickness of the link from the engaging edge permits the use of a maximum of metal while preventing friction between the sides of the link and the material sawed.

Our improved saw is especially applicable for use in a sawing-machine of the type described in our copending application, Serial No. 258,102, filed April 29, 1905, of which the present application is a division.

The outer sides of the teeth are parallel with each other, and a portion of the sides of the link equal to the depth of the abutment is of equal cross-section with the teeth, the incline of the wedge commencing at the lower edge of the abutment.

It will be evident from an inspection of the drawings that the teeth of the saw have cutting edges higher at one end than at the other and also inclined across the length of the link.

Having thus described our invention, what we claim as new, and desire to secure by Letters Patent, is—

1. A chain saw consisting of links substantially wedge-shaped in cross-section and provided on their wider edge with projecting saw-teeth, the cutting edge of the teeth being higher at one end than at the other and inclined across the length of the links, the sides of the teeth being parallel, each of the links being provided with a knuckle at one end and with a pair of ears at the other end for receiving the knuckle of the succeeding link, a rivet traversing alined perforations in the knuckle and the ears, an abutment above the knuckle, and a surface above the ears for coacting with the abutment whereby the links are adapted to open outwardly and to be rigid against inward movement when alined, substantially as and for the purpose set forth.

2. A chain saw consisting of links, substantially wedge-shaped in cross-section and provided on their outer edges with projecting saw-teeth whose edges are higher at one end than at the other and inclined across the length of the links, the said links being connected at their meeting ends by a rule-joint adapted to open outwardly and rigid against inward movement when the links are alined.

SIMON J. GRAY.
JOHN HORNING.

Witnesses:
A. S. ORMSBY,
THOMAS H. PRAY,
ALBERT J. F. MEYER.